United States Patent
Kotani et al.

(10) Patent No.: US 11,194,234 B2
(45) Date of Patent: Dec. 7, 2021

(54) DEVICE, METHOD OF CONTROLLING THE SAME, AND STORAGE MEDIUM

(71) Applicant: CANON KABUSHIKI KAISHA, Tokyo (JP)

(72) Inventors: Junji Kotani, Tokyo (JP); Masato Yoshioka, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/116,913

(22) Filed: Dec. 9, 2020

(65) Prior Publication Data

US 2021/0191238 A1 Jun. 24, 2021

(30) Foreign Application Priority Data

Dec. 18, 2019 (JP) .............................. JP2019-228205

(51) Int. Cl.
*G03B 21/14* (2006.01)
*G03B 21/54* (2006.01)
*H04B 10/116* (2013.01)

(52) U.S. Cl.
CPC ............. *G03B 21/14* (2013.01); *G03B 21/54* (2013.01); *H04B 10/116* (2013.01)

(58) Field of Classification Search
CPC .............................. G03B 21/14; H04B 10/116
USPC ......................................................... 353/122
See application file for complete search history.

(56) References Cited

U.S. PATENT DOCUMENTS

| | | | | |
|---|---|---|---|---|
| 7,453,454 B2 * | 11/2008 | Allen | ..................... | G03B 21/14 345/418 |
| 2007/0091118 A1* | 4/2007 | Allen | ................... | H04N 9/3182 345/619 |

FOREIGN PATENT DOCUMENTS

JP 2007271806 A 10/2007

* cited by examiner

*Primary Examiner* — William C. Dowling
(74) *Attorney, Agent, or Firm* — Canon U.S.A., Inc. IP Division

(57) ABSTRACT

A projector includes a communication unit configured to communicate with an external device, an operation unit configured to receive a user operation, and a system control unit. The system control unit is configured to validate a network function of the communication unit in response to receipt of a particular key sequence received by the operation unit in a stand-by state. The system control unit is configured not to validate the network function of the communication unit even if the operation unit receives the particular key sequence in an image projection state.

20 Claims, 10 Drawing Sheets

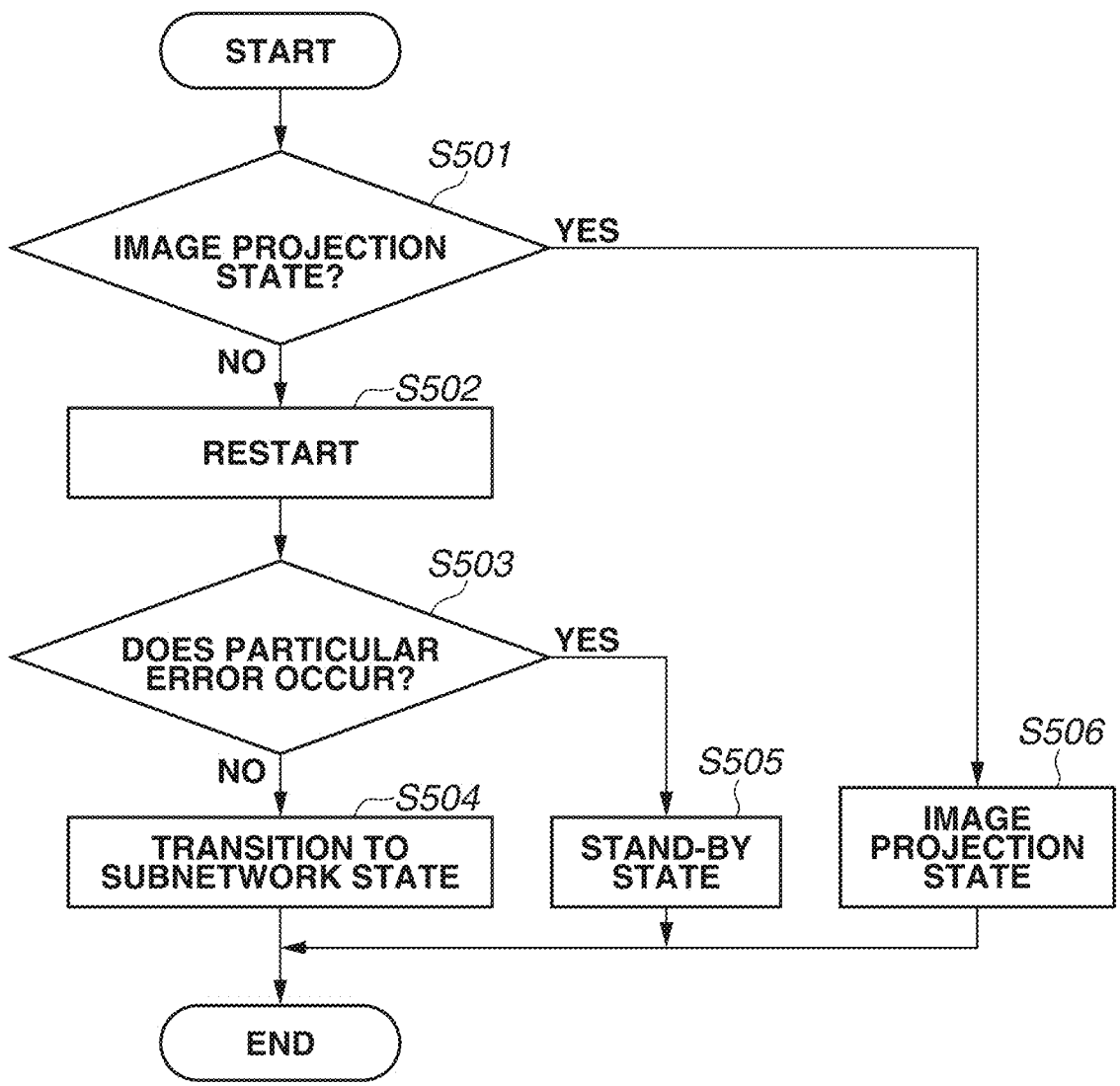

|  | LED 601 | LED 602 | LED 603 |
|---|---|---|---|
| IMAGE PROJECTION STATE | ON | OFF | OFF |
| STAND-BY STATE | OFF | ON | OFF |
| ERROR STATE | OFF | ON | ON |
| SUBNETWORK STATE | ON (SEQUENTIALLY) | ON (SEQUENTIALLY) | ON (SEQUENTIALLY) |

FIG.8

PROJECTOR INFORMATION

| | | |
|---|---|---|
| PERIOD OF TIME OF ENERGIZATION | | 100 H |
| PERIOD OF TIME FOR WHICH LIGHT SOURCE IS TURNED ON | | 50 H |
| NUMBER OF TIMES THAT LIGHT SOURCE IS TURNED ON | | 10 |

| | CURRENT | HIGHEST | THRESHOLD |
|---|---|---|---|
| TEMPERATURE OF SUCKED AIR | 38°C | 39°C | 35°C |
| TEMPERATURE OF DISCHARGED AIR | 30°C | 44°C | 45°C |
| TEMPERATURE OF LIGHT SOURCE | 50°C | 58°C | 60°C |
| TEMPERATURE OF PANEL | 40°C | 55°C | 50°C |

[ RESET HIGHEST VALUE ]

ERROR INFORMATION

2019/02/01 15:01:00 TEMPERATURE OF PANEL EXCEEDS THRESHOLD [55]
2019/02/03 10:10:15 TEMPERATURE OF SUCKED AIR EXCEEDS THRESHOLD [39]

[ SAVE ]  [ RETURN ]

FIG.9

| REMOTE CONTROLLER OR OPERATION UNIT | |
|---|---|
| ELECTRONIC SOUND | ON |
| KEY REPEAT | ON |
| KEY LOCK | OFF |
| SETTING OF LIGHT RECEIVING UNIT OF REMOTE CONTROLLER | CH1 |
| REMOTE CONTROLLER CHANNEL | CH2 |
| SETTING OF [INPUT A-C] BUTTON | ▶ CH3 |
| SETTING OF [FN] BUTTON | CH4 |
| RETURN | ALL |

FIG.10

| REMOTE CONTROLLER OR OPERATION UNIT | |
|---|---|
| ELECTRONIC SOUND | ON |
| KEY REPEAT | ON |
| KEY LOCK | ▸ OFF |
| SETTING OF LIGHT RECEIVING UNIT OF REMOTE CONTROLLER | MAIN BODY |
| REMOTE CONTROLLER CHANNEL | REMOTE CONTROLLER (WIRELESS) |
| SETTING OF [INPUT A-C] BUTTON | |
| SETTING OF [FN] BUTTON | INVALID |
| RETURN | |

DEVICE, METHOD OF CONTROLLING THE SAME, AND STORAGE MEDIUM

BACKGROUND

Field of the Disclosure

The aspect of the embodiments relates to an electronic device, a method of controlling the same, and a storage medium.

Description of the Related Art

A projector discussed in Japanese Patent Application Laid-Open No. 2007-271806 projects a bar code that represents contents of information (system information) on the projector. The bar code provides the system information to an external device. Consequently, a user obtains information, such as a period of time for which the projector is used, a period of time for which a lamp is used, and an error log, and the user can notify a support center of the information. However, if a display device, such as a projector, cannot display an image, the user cannot obtain such information on the display device.

SUMMARY

According to an aspect of the disclosure, a device includes a display unit configured to display an image, a communication unit configured to communicate with an external device, and at least one processor and at least one memory having instructions that, when executed by the at least one processor, perform operations as: a reception unit configured to receive a user operation performed on an operation member, and a control unit configured to control the communication unit, wherein the control unit causes the communication unit to operate in a first communication mode in response to receipt of a first operation received by the reception unit while the display unit does not display an image, and causes the communication unit not to operate in the first communication mode even if the reception unit receives the first operation while the display unit displays an image.

Further features of the disclosure will become apparent from the following description of exemplary embodiments with reference to the attached drawings.

BRIEF DESCRIPTION OF THE DRAWINGS

FIG. 5 is a flowchart illustrating a flow of operations of the projector.

FIG. 8 is a schematic view illustrating a status window that indicates a status of a projector.

FIG. 9 is a schematic view illustrating a channel setting screen.

FIG. 10 is a schematic view illustrating a setting screen used to set a key lock function.

DESCRIPTION OF THE EMBODIMENTS

Figure 1:
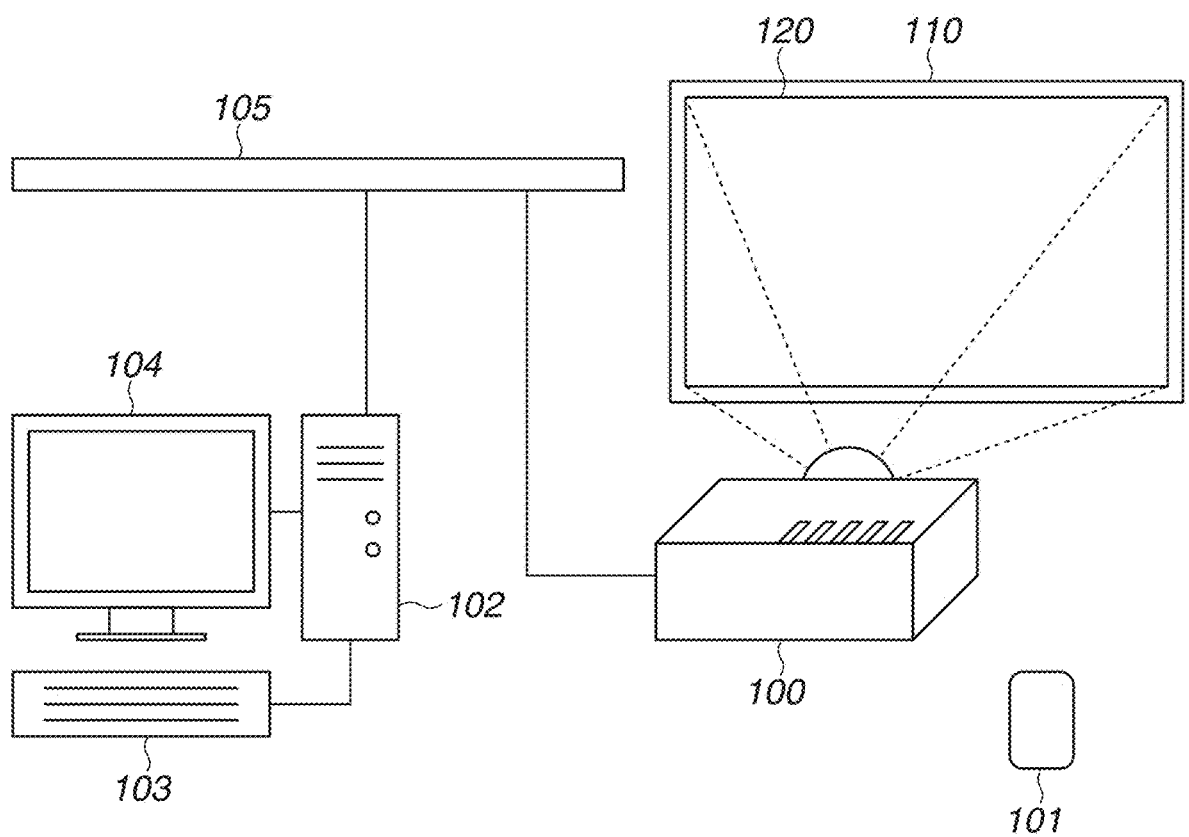
FIG. 1 is a schematic view illustrating a configuration of a display system that includes a display device.

Hereinafter, exemplary embodiments of the disclosure will be described with reference to the drawings. A technical scope of the aspect of the embodiments is determined by the claims. The technical scope of the disclosure is not limited by the exemplary embodiments described below. Not all combinations of features described in the exemplary embodiments are necessarily essential to the disclosure. What is described in the present specification and what is illustrated in the drawings are examples and are not to be considered as limiting the disclosure. What is described in the present specification and what is illustrated in the drawings can be modified in various ways based on the gist of the disclosure, and such modifications are not excluded from the scope of the disclosure. In other words, all combinations of each of the exemplary embodiments and the modification(s) are included in the disclosure.

FIG. 1 is a schematic view illustrating a configuration of a display system that includes a display device.

The display system in FIG. 1 includes a projector 100, a remote controller 101, a personal computer (PC) 102, a keyboard 103, a display 104, and a network 105.

The projector 100 is a projection device that projects a projected image 120 on a projection surface 110. The projector 100 communicates with the other devices via the network 105. The projector 100 is controlled by a user who operates an operation member (operation unit 217) of a main body of the projector 100 or the remote controller 101. The operation member (operation unit 217) and the remote controller 101 will be described below. The projector 100 is an example and may be another electronic device that can display images and can communicate with the other devices. The projector 100 may be, for example, a display, a mobile personal computer, a smartphone, or a tablet.

The projector 100 can perform control to validate or invalidate communication via the network 105 (network function). While the projector 100 is in a state not projecting the projected image 120 (stand-by state), the projector 100 can validate the network function in response to input of a particular key sequence.

The remote controller 101 is a remote control device used to operate the projector 100. The remote controller 101 includes a plurality of operation members (buttons). The remote controller 101 outputs a signal that corresponds to a button pressed by a user. The projector 100 operates based on a signal that the projector 100 has received from the remote controller 101. The remote controller 101 outputs signals by an infrared communication scheme. A method by which the remote controller 101 outputs the signals is not limited to the infrared communication scheme.

The PC 102 is connected with the projector 100 via the network 105. The PC 102 is a control device that controls the projector 100. The PC 102 uses information related to access to establish communication between the PC 102 and the projector 100 via the network 105. The information related to access includes, for example, an internet protocol (IP) address assigned to the projector 100 set to the projector 100. The PC 102 obtains information related to the projector 100 from the projector 100. The information related to the projector 100 includes, for example, a usage state log and an error log of the projector 100.

The keyboard 103 is an operation member used to operate the PC 102. The keyboard 103 is an example of the operation member. The operation member may be another member such as a mouse or a touch panel. Alternatively, a plurality of kinds of operation members may be provided.

The display 104 is a display device that displays an image output from the PC 102. The display 104 displays, for example, a control graphical user interface (GUI) used to control the projector 100 connected with the PC 102.

A user operates a control GUI displayed on the display 104 with the operation member such as the keyboard 103. Consequently, the user can control operation of the projector 100 and check a status of the projector 100.

A form of the PC 102, the keyboard 103, and the display 104 is not limited as long as the PC 102, the keyboard 103, and the display 104 are connected with the projector 100 via the network 105 and are controllable. The PC 102, the keyboard 103, and the display 104 may be, for example, a laptop, a tablet computer, or a smartphone.

Figure 2:
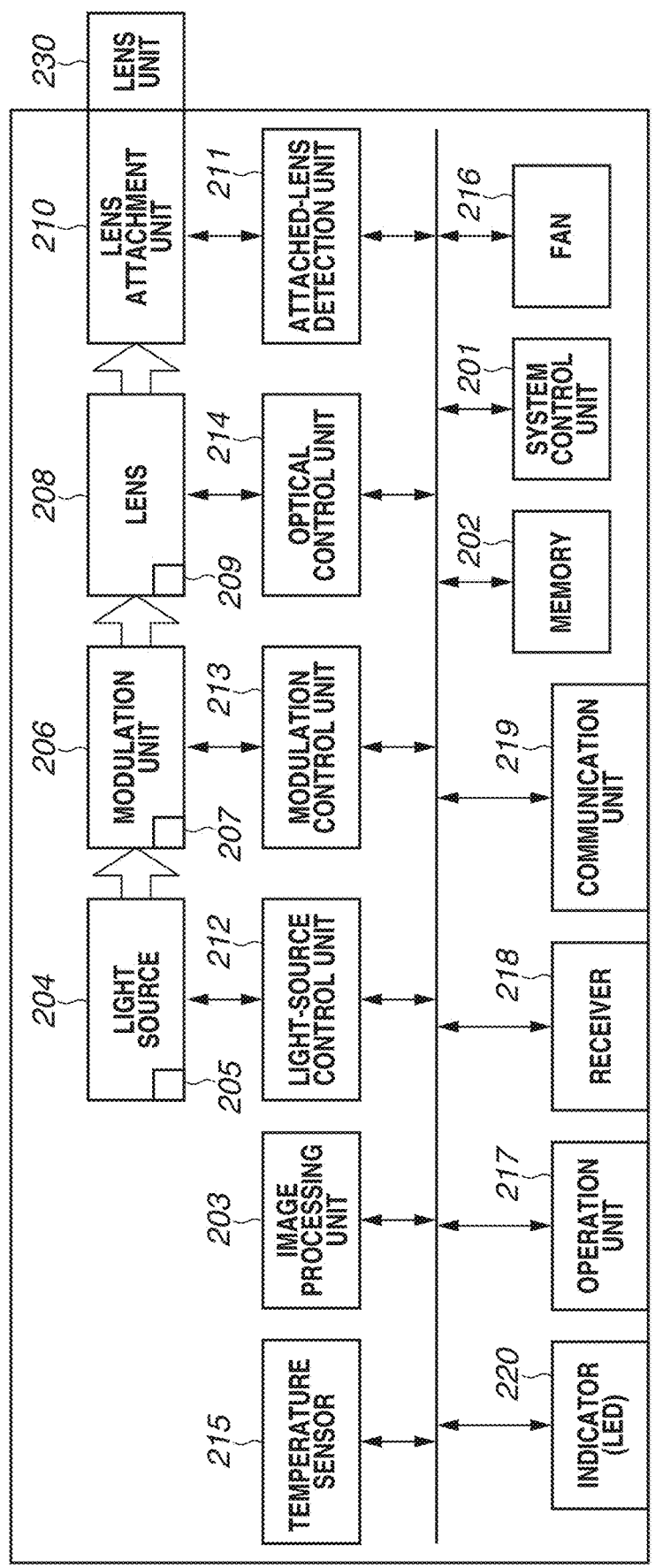
FIG. 2 is a block diagram illustrating function blocks of a projector.

FIG. 2 is a block diagram illustrating function blocks of the projector 100.

The projector 100 includes a system control unit 201, a memory 202, an image processing unit 203, a light source 204, a sensor 205, a modulation unit 206, a sensor 207, lens 208, a sensor 209, a lens attachment unit 210, and an attached-lens detection unit 211. The projector 100 also includes a light-source control unit 212, a modulation control unit 213, an optical control unit 214, a temperature sensor 215, a fan 216, the operation unit 217, a receiver 218, a communication unit 219, and an indicator 220.

The system control unit 201 is a processor that controls operation of the projector 100. The system control unit 201 includes, for example, a central processing unit (CPU). The system control unit 201 reads programs from the memory 202 and executes the programs to control operation of the projector 100. The system control unit 201 may include one processor or may include two or more processors. Some functions of the system control unit 201 may be performed by an electric circuit.

The memory 202 includes a storage medium. The memory 202 stores programs executed by the system control unit 201, and parameters used when the programs are executed. The memory 202 also stores image data that corresponds to an image projected by the projector 100. The memory 202 stores data on GUI image, such as a menu screen, used to set operation of the projector 100. The memory 202 includes a storage medium selected from among various storage media such as a nonvolatile storage medium and a volatile storage medium.

The image processing unit 203 includes an image processing circuit that applies predetermined image processing to image data read from the memory 202 or image data input from outside. Image processing performed by the image processing unit 203 includes, for example, conversion processing of resolution (the number of pixels), enlargement and reduction (scaling) processing, noise cancelling processing, and edge enhancement processing of image data. The image processing unit 203 also performs geometric correction (keystone correction) to geometrically correct a shape of image data. Consequently, a shape of an image projected onto a projection surface is changed to a predetermined shape (for example, a rectangle).

The light source 204 supplies light to the modulation unit 206. The sensor 205 senses a state of the light source 204. The sensor 205 senses, for example, luminance and a temperature of the light source 204, and outputs the sensed luminance and temperature to the light-source control unit 212. The light-source control unit 212 controls a quantity of light of the light source 204. The light-source control unit 212 also monitors a state of the light source 204, and outputs the monitored state to the system control unit 201 or the memory 202. For example, if the light-source control unit 212 senses a temperature of the light source 204 that is higher than a threshold, the light-source control unit 212 outputs an error flag of a high temperature of the light source 204. The light-source control unit 212 also outputs information that indicates a period of time for which the light source 204 has been used.

The modulation unit 206 includes, for example, one liquid crystal panel or three liquid crystal panels. The modulation unit 206 modulates light output from the light source 204, and outputs an image. The sensor 207 senses a state of the modulation unit 206. For example, the sensor 207 senses a temperature of each liquid crystal panel of the modulation unit 206, and outputs the sensed temperature to the modulation control unit 213. The modulation control unit 213 controls the modulation unit 206 based on image data processed by the image processing unit 203. The modulation control unit 213 also monitors a state of the modulation unit 206, and outputs the monitored state to the system control unit 201 or the memory 202. For example, if a temperature of each liquid crystal panel of the modulation unit 206 is higher than a threshold, the modulation control unit 213 outputs an error flag of a high temperature of the liquid crystal panel.

The lens 208 constitute a projection optical system that projects an image onto a projection surface. Light emitted by the light source 204 is modulated by the modulation unit 206, and thus the image is obtained. The lens 208 include a zoom lens and a focus lens. The sensor 209 senses positions of the zoom lens and the focus lens, and outputs the sensed positions to the optical control unit 214. The optical control unit 214 controls operation of the zoom lens, the focus lens, and the like of the lens 208. Consequently, the optical control unit 214 adjusts a zoom magnification and a focus. The optical control unit 214 outputs information that indicates the positions of the zoom lens and the focus lens and is obtained from the sensor 209 to the system control unit 201 or the memory 202.

The lens attachment unit 210 is a member to which a lens unit 230, which is attachable to the projector 100, is attached. The attached-lens detection unit 211 detects whether the lens unit 230 is attached to the lens attachment unit 210, and outputs a detection result to the system control unit 201 or the memory 202.

The temperature sensor 215 detects a temperature within the projector 100. The temperature sensor 215 detects, for example, a temperature of a circuit board that includes the system control unit 201 and the image processing unit 203. The temperature sensor 215 may also detect a temperature of outside air sucked in by the fan 216. A plurality of temperature sensors 215 may be provided. If a temperature that the system control unit 201 has obtained from the temperature sensor 215 is higher than a predetermined threshold, the system control unit 201 outputs an error flag of a high temperature to the memory 202 and performs control to decrease heat generated from the projector 100. For example, a quantity of light of the light source 204 is decreased to decrease the heat generated from the projector 100.

The fan 216 sucks air outside the projector 100 into the projector 100. The system control unit 201 controls the number of rotations of the fan 216. The system control unit 201 senses the number of rotations of the fan 216, and thus monitors an operation state of the fan 216.

The operation unit 217 includes a plurality of operation members (buttons) provided to the main body of the projector 100. The operation unit 217 receives a user operation on the plurality of operation members. The operation unit 217 outputs a signal that corresponds to the user operation to the system control unit 201. The system control unit 201 is a reception unit that receives a signal that corresponds to the user operation on the operation unit 217. The system control unit 201 controls the projector 100 in response to a signal that the system control unit 201 has received from the operation unit 217.

The receiver 218 is a member that receives signals output from the remote controller 101. In other words, the receiver 218 receives the user operation on the remote controller 101.

Figure 3A:
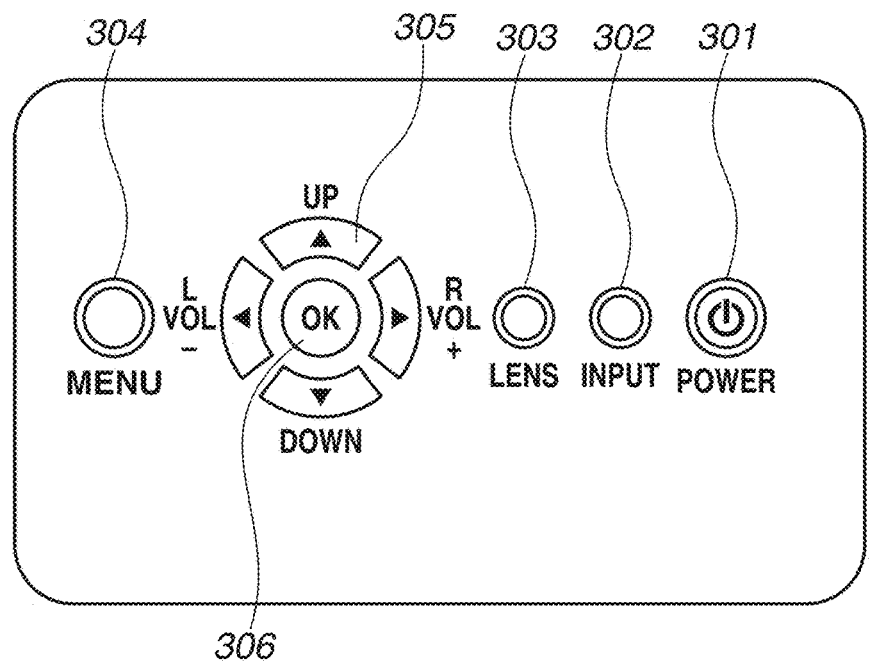
FIGS. 3A and 3B are schematic views illustrating a plurality of operation members of an operation unit and a plurality of operation members of a remote controller.
Figure 3B:
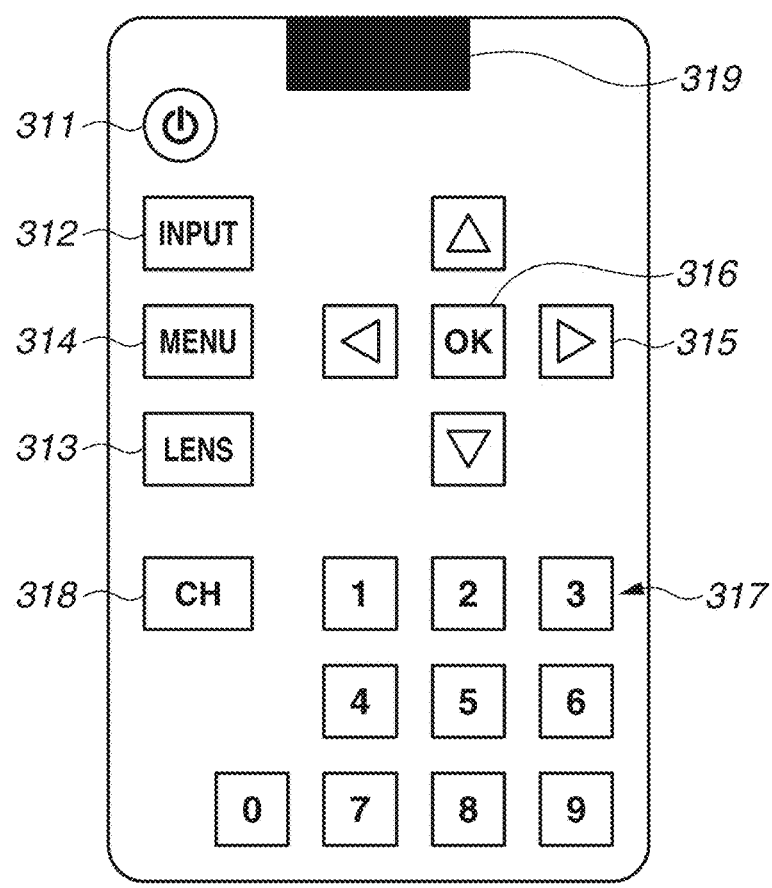

FIGS. 3A and 3B are schematic views illustrating a plurality of operation members of the operation unit 217 and a plurality of operation members of the remote controller 101. FIG. 3A is a schematic view that illustrates the plurality of operation members of the operation unit 217.

The operation unit 217 includes a power button 301, an input button 302, a lens button 303, a menu button 304, cursor buttons 305, and an OK button 306.

The power button 301 is used to input an instruction to switch states of the projector 100. Pressing down the power button 301 switches among an image projection state (image display mode), a stand-by state (stand-by mode), and a subnetwork state (subnetwork mode). The states of the projector 100 may also be referred to as operation modes. Each of the states and the switching operations will be described below.

The input button 302 is used to input an instruction to switch input units into which image data is input. The projector 100 uses the image data to project an image.

The lens button 303 is an operation button used to start control of the zoom lens and the focus lens of the lens 208. In response to pressing down the lens button 303, the system control unit 201 controls the projector 100 to project a screen used to control zooming and focusing of the lens 208. In response to the user operating the cursor buttons 305 that will be described below while the screen is displayed, the system control unit 201 controls the zoom lens and the focus lens of the lens 208.

The menu button 304 is an operation button used to start control for setting the operation of the projector 100. In response to pressing the menu button 304, the system control unit 201 controls the projector 100 to project a menu screen. The menu screen has a hierarchical structure, and includes a screen used to validate or invalidate a network function. The menu screen also include a screen used to set access information. The access information is used when the network function is valid and includes, for example, an IP address and a service set identifier (SSID).

The cursor buttons 305 include an up button, a down button, a left button, and a right button. While the menu screen is projected, the user operates the cursor buttons 305 to select one of a plurality of items contained in the menu screen, to input a numerical value, and to move a position of a projected marker.

The OK button 306 is used to input an instruction that indicates completion of the user operation. For example, if a plurality of items is projected in the menu screen, the user selects one of the items using the cursor buttons 305, and presses the OK button 306. Consequently, a process that corresponds to the selected item is performed.

FIG. 3B is a schematic view that illustrates the plurality of operation members of the remote controller 101.

The remote controller 101 includes a power button 311, an input button 312, a lens button 313, a menu button 314, cursor buttons 315, and an OK button 316. The remote controller 101 also includes number buttons 317, a channel button 318, and a transmitter 319.

The power button 311, the input button 312, the lens button 313, the menu button 314, the cursor buttons 315, and the OK button 316 have functions that are the same as the functions of the corresponding buttons of the operation unit 217, respectively, and thus will not be described.

The number buttons 317 are a group of buttons used to enter numbers from zero to nine. The number buttons 317 are a group of buttons constituting a so-called numeric keypad.

The channel button 318 is used in combination with the number buttons 317 to set a channel to the remote controller 101. The channel will be described. In a case where a plurality of projectors is operated with one remote controller 101, the user may want to operate only one of the plurality of projectors. In such a case, a channel is preliminarily assigned to each of the projectors. Then, the channel assigned to the target projector is set to the remote controller 101. Consequently, the target projector is controlled with the remote controller 101. While the channel button 318 is pressed, the number buttons 317 corresponding to a number of the channel that is to be set to the remote controller 101 is pressed. Consequently, the channel is set to the remote controller 101.

The transmitter 319 outputs a signal that corresponds to a button of the remote controller 101 pressed by a user.

Refer to the block diagram of FIG. 2 again.

The communication unit 219 is a communication interface used for communicating with an external device via the network 105. The communication unit 219 is connected to the network 105 via a local area network (LAN) cable. The communication unit 219 may be connected with the network 105 by wireless, for example, through Wi-Fi. The projector 100 may include both a communication interface connected with the network 105 through a cable and a communication interface connected with the network 105 by wireless. Alternatively, the projector 100 may include a plurality of kinds of communication interfaces.

The system control unit 201 can validate or invalidate a function of communicating with an external device using the communication unit 219 via the network 105 (network function). A user uses a setting screen for the network function to set the network function valid or invalid. The setting screen for the network function is included in the menu screen. The network function set valid or invalid by a user operation on the menu screen is referred to as an ordinary network function. If the ordinary network function is valid, the communication unit 219 operates in an ordinary network mode. The ordinary network mode is one of communication modes in which the communication unit 219 operates.

Access information used in the ordinary network function can be uniquely set by a user operating the menu screen. An external device uses the access information to access the projector 100 via the network 105. The access information includes an IP address and a subnet mask if the projector 100 is connected to the network 105 through a cable. Alternatively, the access information includes an SSID, an IP address, and a subnet mask if the projector 100 is connected with the network 105 by wireless.

If the ordinary network function of the projector 100 is valid, the PC 102 can access the projector 100 via the network 105 and can obtain information (system information) on the projector 100. The system information includes device information on the projector 100 (a model number, and access information such as an IP address), information on usage history (a period of time of usage, a period of time for which the light source 204 is driven, and an error log), and information that indicates a current state of the projector 100 (state of the projector 100). The PC 102 obtains the information via the network 105, and displays the information in the form of a GUI image. Consequently, the user can easily check, for example, what error is currently occurring in the projector 100.

The projector 100 can validate the network function even if the menu screen projected by the projector 100 is not operated.

A display device such as the projector 100 cannot project an image depending on detection results by the various sensors described above or due to an error occurred to a circuit board such as the image processing unit 203. If the display device cannot project an image while the ordinary network function is invalid, it is difficult for the projector 100 to project the state of the projector 100, and it is difficult for an external device to obtain information such as an error log on the projector 100. Thus, there is an issue that the user cannot determine a cause that does not allow the projector 100 to project an image. If the ordinary network function is always validated, there are an issue that electricity consumption increases and a security issue.

Thus, the projector 100 validates the network function in response to input of a predetermined key operation (key sequence) into the operation unit 217 or the remote controller 101. Consequently, even if a temperature of the light source 204 is too high and thus the projector 100 cannot project an image while the network function is invalid, the network function is validated, and the state of the projector 100 can be checked from outside the projector 100.

A state in which the network function is validated with the particular key sequence, as described above, is referred to as a subnetwork state. The network function at this time is referred to as a subnetwork function. If the subnetwork function is valid, the communication unit 219 operates in a subnetwork mode. A communication scheme for the subnetwork function is similar to the communication scheme for the ordinary network function. The subnetwork function can use a wired LAN, a wireless LAN, or Wi-Fi. The subnetwork function is a network function that can be forcedly validated with the particular key sequence without operation on a menu image. Thus, the subnetwork function can also be referred to as a forced network function. A state in which the subnetwork function is validated (subnetwork state) can be referred to as a forced network on state (forced NW-ON state). The subnetwork mode is one of communication modes in which the communication unit 219 operates.

The indicator 220 includes a plurality of light-emitting diodes (LEDs). The indicator 220 is a notification unit that visually notifies the user of the state of the projector 100.

Figure 4:
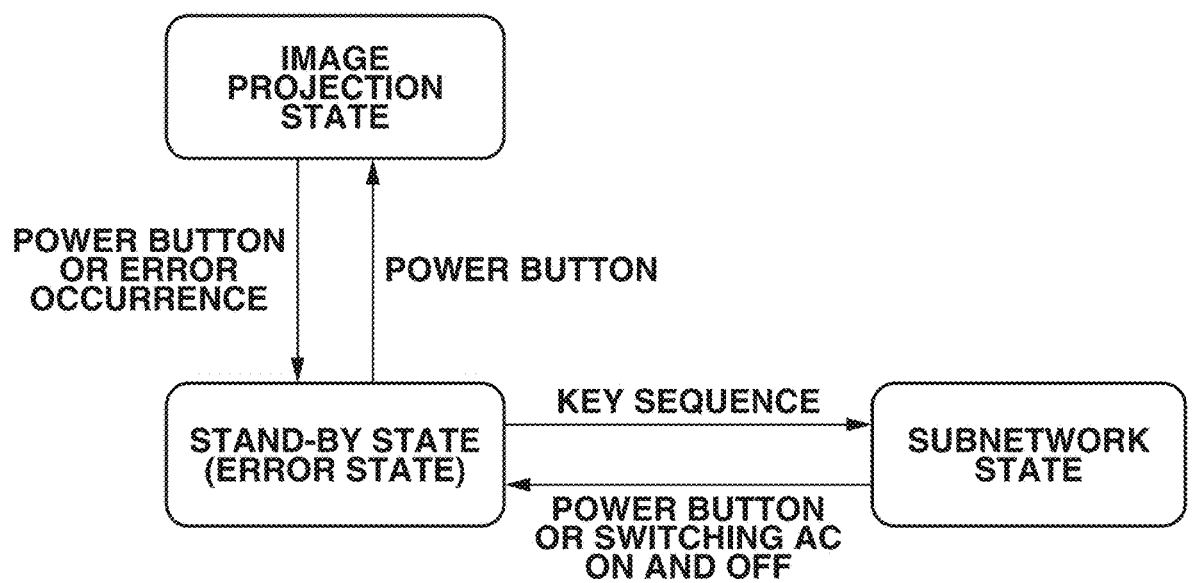
FIG. 4 is a state transition diagram illustrating transitions between states of the projector.

FIG. 4 is a state transition diagram illustrating transitions between states of the projector 100.

The projector 100 performs transitions between an image projection state and a stand-by state and between the stand-by state and a subnetwork state of the projector 100. The image projection state is a state in which electric power is supplied to the projector 100 and the system control unit 201 controls each of functional blocks so that an image is projected onto a projection surface. In this case, each of the functional blocks of the projector 100 is supplied with electric power and is driven. The image projection state is a state in which the projector 100 is used to project an image.

The stand-by state is a state in which the projector 100 is supplied with electric power but the light source 204 and the like are not driven. More specifically, the stand-by state is a state in which the light source 204, the light-source control unit 212, the modulation unit 206, the modulation control unit 213, the lens 208, and the optical control unit 214 do not operate. In contrast, the system control unit 201 operates in a state where functions of the system control unit 201 are limited relative to functions of the system control unit 201 in the image projection state. The system control unit 201 receives signals received from the remote controller 101 via the receiver 218 and signals input from the operation unit 217. The stand-by state is a standby state in which the projector 100 is connected to a power source but does not project an image.

In response to pressing the power button 301 or 311, the system control unit 201 controls the projector 100 to switch between the image projection state and the stand-by state. If a predetermined error occurs in the image projection state, the system control unit 201 switches the projector 100 from the image projection state to the stand-by state without a user operation.

The subnetwork state is a state in which the network function is validated with the particular key sequence. Parameters (access information) used by an external device to communicate with the projector 100 differ between the network function in the subnetwork state and the ordinary network function. The access information for the ordinary network function is not set to fixed values. However, the access information for the network function in the subnetwork state (subnetwork function) is set to fixed values. Consequently, even if the projector 100 cannot project an image, the user can access the projector 100 from outside by using preset fixed values if the subnetwork function is valid. If the access information for the ordinary network function is set to arbitrary values, the user is to check the access information set to the projector 100 to access the projector 100. Since the user cannot check the access information in the state where the projector 100 cannot project an image, validating the subnetwork function allows the user to easily access the projector 100.

A transition to the subnetwork state is performed by inputting the particular key sequence into the operation unit 217 or the remote controller 101. The particular key sequence is preset. For example, in a case where the operation unit 217 of the projector 100 is operated, the particular key sequence corresponds to pressing the up button of the cursor buttons 305 twice, pressing the down button of the cursor buttons 305 twice, pressing the input button 302 once, and pressing the menu button 304 once. In one embodiment, a sequence of button operations is performed by the user when the user ordinarily uses the projector 100 be not used as the particular key sequence.

A return from the subnetwork state is performed by pressing the power button 301 or by stopping and restarting power supply (alternating current (AC)) to the projector 100. The projector 100 returns from the subnetwork state to the stand-by state.

If a transition from the stand-by state to the subnetwork state is performed, various set parameters that have been set in the stand-by state are temporarily stored (saved) in the memory 202. When the projector 100 returns from the subnetwork state to the stand-by state, the set parameters stored in the memory 202 are read. Thus, the projector 100 returns to the stand-by state the same as the stand-by state before the transition to the subnetwork state. For example, a case is described where the ordinary network function is valid in the stand-by state, and access information is uniquely set. In this case, even if the subnetwork function is validated in the subnetwork state and the access information is set to fixed values, the access information is reset in response to the return to the stand-by state. The access information before the transition to the subnetwork state is set as the reset access information.

FIG. 5 is a flowchart illustrating a flow of operations of the projector 100 in a case where the particular key sequence is input. The present flowchart starts when the system control unit 201 detects that the particular key sequence is input into the operation unit 217 or the remote controller 101.

In step S501, the system control unit 201 determines whether the projector 100 is in the image projection state. If the projector 100 is in the image projection state (YES in step S501), the processing proceeds to step S506. In step S506, the system control unit 201 keeps the projector 100 in the image projection state, and the processing ends. In the image projection state, the menu screen or the like can be projected. Thus, the user validates the ordinary network function, and thus the user can check the information on the projector 100 from an external device. Alternatively, the user can also check the state of the projector 100 by displaying the system information on the projector 100 on the menu screen of the projector 100.

If it is determined that the projector 100 is not in the image projection state (NO in step S501), the processing proceeds to step S502. In step S502, the system control unit 201 restarts the projector 100.

In step S503, the system control unit 201 determines whether a particular error occurs in the projector 100 that has been restarted. The particular error may be, for example, unstable power supplying capability to the system control unit 201 or abnormal rotation of the fan 216. An error that may not allow the projector 100 to stably operate in the subnetwork state is preliminarily set as the particular error. If it is determined that the particular error occurs (YES in step S503), the processing proceeds to step S505. In step S505, the system control unit 201 sets the projector 100 to the stand-by state, and the processing ends.

If it is determined that the particular error does not occur (NO in step S503), the system control unit 201 causes the projector 100 to transition to the subnetwork state, and the processing ends. Since the projector 100 transitions to the subnetwork state, the subnetwork function is validated. Thus, the user can communicate with the projector 100 using preset access information from an external device such as the PC 102.

The above flowchart illustrates that if the projector 100 is in the image projection state, the transition of the projector 100 to the subnetwork state is not performed even if the projector 100 receives the particular key sequence. Further, the transition to the subnetwork state can be performed even if an error does not occur. This is to allow the transition to the subnetwork state to be performed even if a malfunction that has not been set as the error of the projector 100 occurs, and the projector 100 cannot project an image.

Figures 6A, 6B:
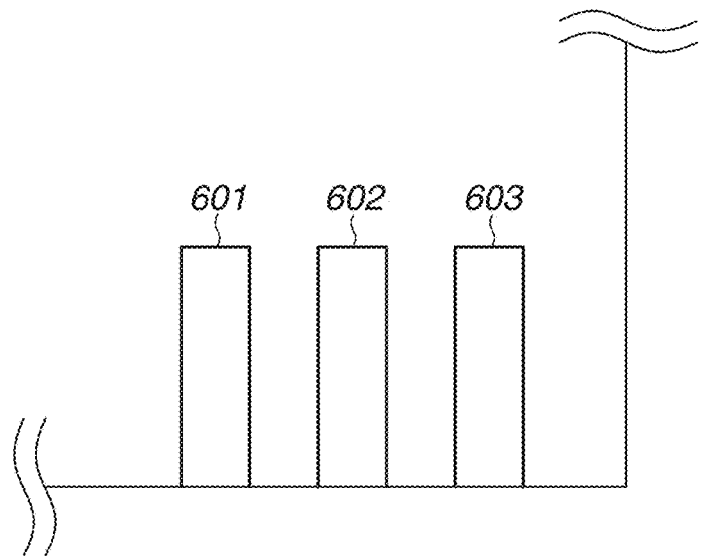
FIGS. 6A and 6B are schematic views each illustrating a display mode of an indicator in each of states of the projector.

FIGS. 6A and 6B are schematic views each illustrating a display mode of the indicator 220 in each of the states of the projector 100. FIG. 6A is a schematic view that illustrates positions of a plurality of LEDs of the indicator 220. The indicator 220 includes LEDs 601 to 603. The LED 601 is an LED that emits green light. The LEDs 602 and 603 emit red light.

FIG. 6B is a table that illustrates states of each of the LEDs 601 to 603 that is turned on or off corresponding to the state of the projector 100. If the projector 100 is in the image projection state, the system control unit 201 turns on the LED 601 of the indicator 220, and turns off the LEDs 602 and 603 of the indicator 220. If the projector 100 is in the stand-by state, the system control unit 201 turns on the LED 602 of the indicator 220, and turns off the LEDs 601 and 603 of the indicator 220.

If an error occurs in the projector 100, the projector 100 enters an error state. In this case, the system control unit 201 turns on the LEDs 602 and 603 of the indicator 220, and turns off the LED 601 of the indicator 220. The error state can also be referred to as the stand-by state in which an error has occurred. If an error occurs in the image projection state, the projector 100 transitions from the image projection state to the stand-by state. Such a state is referred to as an error state, and thus is distinguished from the normal stand-by state. An operation state inside the projector 100 is similar to that in the stand-by state except for part that does not perform normal operations due to occurrence of the error.

If the projector 100 is in the subnetwork state, the system control unit 201 makes the LEDs of the indicator 220 blink sequentially. Consequently, even a user apart from the projector 100 can visually recognize at a glance that the projector 100 has transitioned to the subnetwork state.

The PC 102 establishes communication with the projector 100 via the network 105 based on the access information that is preset. The PC 102 obtains the system information from the projector 100. As described above, the system information includes the device information on the projector 100 (a model number, and access information such as an IP address), the information on usage history (a period of time of usage, a period of time for which the light source 204 is driven, and an error log), and the information that indicates the current state of the projector 100 (state of the projector 100).

Figure 7:
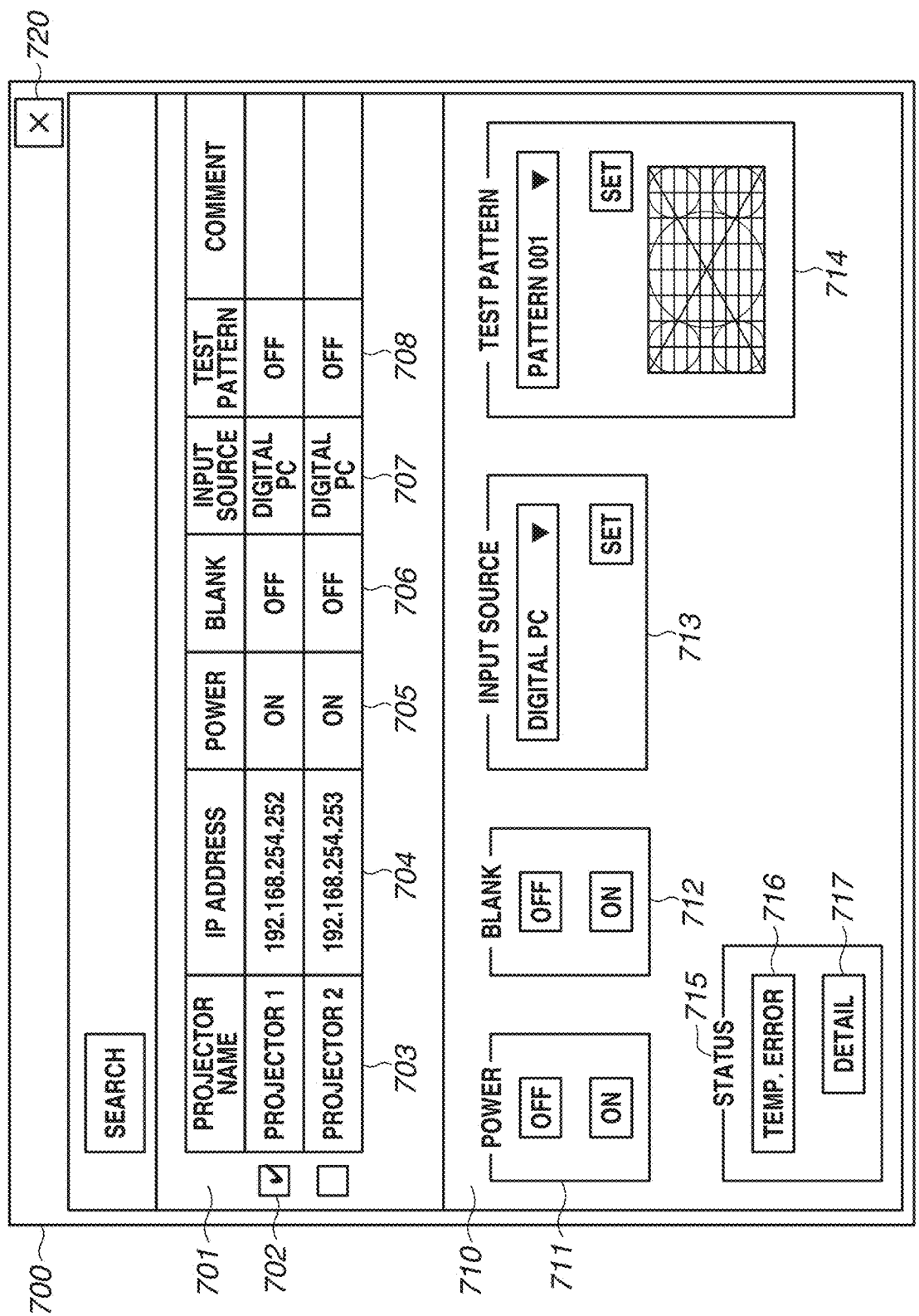
FIG. 7 is a schematic view illustrating a control graphical user interface (GUI) used to control each projector from a personal computer (PC).

FIG. 7 is a schematic view illustrating a control GUI 700 used to control each projector from the PC 102 via the network 105. The control GUI 700 is displayed on the display 104. A user operates an operation member, such as the keyboard 103, provided to the PC 102 to operate the control GUI 700 to transmit an instruction to each projector. The user operates a setting screen included in the control GUI 700 to change settings of each projector. In other words, the control GUI 700 is a setting image used to set each projector.

The control GUI 700 includes a list display area 701 and a setting area 710. The list display area 701 displays a list of projectors with which the PC 102 can communicate. In the present exemplary embodiment, the PC 102 is communicably connected with a plurality of projectors via a network. The plurality of projectors has the same configuration as the configuration of the projector 100 described above.

The list display area 701 includes a checkbox 702. The checkbox 702 is used to select a target projector from among projectors with which the PC 102 can communicate. Settings of the selected target projector can be changed by using GUI of the setting area 710. The list display area 701 also includes an area 703 where a name of a projector with which the PC 102 can communicate is displayed, and an area 704 where an IP address of the projector with which the PC 102 can communicate are displayed. The list display area 701 also includes an area 705 that indicates whether each of the projectors with which the PC 102 can communicate is in a power on state or in a power off state. The power on state is the image projection state. The power off state is the stand-by state.

The list display area 701 includes an area 706 that indicates whether each of the projectors with which the PC 102 can communicate projects a blank image (optical black image). If the area (blank) 706 is on, the projector projects the optical black image. The list display area 701 includes an area 707 that indicates a current input source of each of the projectors with which the PC 102 can communicate. The list display area 701 also includes an area 708 that indicates whether each of the projectors with which the PC 102 can communicate projects a test pattern.

Information on each of the items indicated in the list display area 701 is updated in response to a change in operations or settings of the projectors.

The setting area 710 is an area in which the GUI is displayed, and the GUI is used to set each of setting items of the target projector that has been selected by checking the checkbox 702 in the list display area 701.

A GUI image 711 is a GUI used to control a state of power of the target projector. The GUI image 711 corresponds to the power button 301 of the operation unit 217 or the power button 311 of the remote controller 101. In other words, switching power on in the GUI image 711 makes a target projector transitions the state from the stand-by state to the image projection state. If the target projector is in the subnetwork state, switching the power on in the GUI image 711 transitions the target projector from the subnetwork state to the stand-by state.

A GUI image 712 is a GUI used to control whether to allow the target projector to display a blank image. A GUI image 713 is a GUI used to control an input source of the target projector. A user uses a pull-down menu to select one of input sources, and determines the input source by using the set button. Consequently, the input source of the target projector is switched to the selected source.

A GUI image 714 is a GUI used to control whether to cause the target projector to display a test pattern. The GUI image 714 includes a pull-down menu used to select one of test patterns. The user selects one of test patterns using the pull-down menu, and determines the selected test pattern using a set button. Consequently, the target projector projects an image that corresponds to the selected test pattern. The GUI image 714 includes an area where a preview image of the test pattern that has been selected using the pull-down menu is displayed.

A GUI image 715 is a GUI used to display a status of the target projector. The GUI image 715 includes an area 716 for notifying the status of the target projector, and a detail button 717 displaying a window used to check details of the status of the target projector. In an example illustrated in FIG. 7, the area 716 indicates that the target projector is in a temperature error (temp. error) state. If the user wants to check the details of a status of the target projector, the user operates the detail button 717 to display a status window on the display 104.

FIG. 8 is a schematic view illustrating a status window 800 that indicates a status of the projector. The status window 800 may overlap the control GUI 700 on a screen of the display 104. Alternatively, the image displayed on the display 104 may be switched from the control GUI 700 to the status window 800.

The status window 800 displays information based on the system information obtained from the target projector. The status window 800 illustrated in FIG. 8 indicates an error log, a log of values output from each of the sensors, a period of time of energization, the number of times that the light source 204 is turned on, and a period of time for which the light source 204 is turned on, of the target projector.

The user checks the status window 800 to check the status of the target projector.

As described above, the projector 100 according to the present exemplary embodiment validates the network function in response to receipt of a particular key sequence input into the operation unit 217 or the remote controller 101, without any operation using the GUIs. The access information for the network function to be validated in response to the receipt of the particular key sequence is the fixed values. Thus, the user can easily access the projector 100 irrespective of a state of usage of the network function just before the access. Thus, even if the projector 100 cannot project an image, the user can easily determine the state of the projector 100 and a cause of an error.

If there is a plurality of projectors including the projector 100, a channel may be set to the remote controller 101.

FIG. 9 is a schematic view illustrating a channel setting screen in the menu screen. The user uses the operation unit 217 or the remote controller 101 to operate the channel setting screen, and thus assigns a channel to the projector 100.

For example, a case is cited where CH1 that is a remote controller channel has been preliminarily assigned to the projector 100. At this time, if a channel setting of the remote controller 101 is set to CH1, the projector 100 receives a signal output from the remote controller 101, and performs an operation that corresponds to the signal. Alternatively, if the channel setting of the remote controller 101 is not set to CH1, even if the remote controller 101 outputs a signal that corresponds to an operation, the projector 100 does not perform the operation that corresponds to the signal.

However, the projector 100 transitions to the subnetwork state in response to receipt of a particular key sequence input to the remote controller 101 even if the channel assigned to the projector 100 and the channel set to the remote controller 101 are different. Further, the projector 100 performs control to return the projector 100 from the subnetwork state to the stand-by state in response to receipt of operation on the power button 301 or 311 even if the channel assigned to the projector 100 and the channel set to the remote controller 101 are different. In other words, the projector 100 receives operation related to the subnetwork state as an exception even if the channel assigned to the projector 100 does not coincide with the channel set to the remote controller 101.

The channel setting is performed using the channel setting screen included in the menu screen.

A key lock function can be set to the projector 100. The key lock function does not allow the projector 100 to receive input from the operation unit 217 or the remote controller 101. If the remote controller 101 or the operation unit 217 of the main body of the projector 100 is operated by mistake while an image is projected, an unnecessary menu screen may be projected or projection of an image may be stopped. A function that does not allow the projector 100 to receive input from the operation unit 217 or the remote controller 101, and thus decreases an influence of such a wrong operation is referred to as the key lock function.

FIG. 10 is a schematic view illustrating a setting screen used to set the key lock function in the menu screen. If an item "invalid" in FIG. 10 is selected, the key lock function is invalid. In other words, the projector 100 operates in response to an operation signal from either the operation unit 217 or the remote controller 101. If an item "main body" is selected, the projector 100 performs operations related to a transition to the subnetwork state and operations related to a return to the stand-by state, among operations performed by operating the operation unit 217 of the main body of the projector 100. If an item "remote controller" is selected, the projector 100 performs the operations related to the transition to the subnetwork state and the operations related to the return to the stand-by state, among the operations performed by operating the remote controller 101. In other words, the key lock function of the projector 100 is set while the projector 100 projects the menu screen.

Even if the key lock function of the projector 100 is set to valid, it cannot be determined whether the key lock function is valid and it cannot be determined which of the operation members is an object of the key lock function if the projector 100 is a state where an image cannot be projected.

To deal with such an issue, the projector 100 transitions to the subnetwork state in response to receipt of a particular key sequence even if the key lock function is valid. Further, the projector 100 performs a control to return the projector 100 from the subnetwork state to the stand-by state in response to operating the power button 301 or 311 even if the key lock function is valid. In other words, the projector 100 receives an operation related to the transition to the subnetwork state and an operation related to the return to the stand-by state even if the key lock function is valid. The projector 100 performs a switching operation that corresponds to the received operation. Consequently, the user can easily check information on the projector 100.

After the projector 100 transitions to the subnetwork state in response to receipt of a particular key sequence, the system control unit 201 may transition the projector 100 to the stand-by state if an external device does not access the projector 100 for a predetermined period of time and the operation unit 217 and the remote controller 101 are not operated for the predetermined period of time.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-228205, filed Dec. 18, 2019, which is hereby incorporated by reference herein in its entirety.

What is claimed is:

1. A device comprising:
a display unit configured to display an image;
a communication unit configured to communicate with an external device; and
at least one processor and at least one memory having instructions that, when executed by the at least one processor, perform operations as:
a reception unit configured to receive a user operation performed on an operation member; and
a control unit configured to control the communication unit,
wherein the control unit causes the communication unit to operate in a first communication mode in response to receipt of a first operation received by the reception unit while the display unit does not display an image, and causes the communication unit not to operate in the first communication mode even if the reception unit receives the first operation while the display unit displays an image.

2. The device according to claim 1, wherein the control unit is configured to cause the communication unit to operate in a second communication mode in response to receipt, by the reception unit, of an operation on a setting image displayed by the display unit.

3. The device according to claim 2,
wherein the first communication mode is a communication mode in which a communication parameter used by the external device to communicate with the communication unit is set to a fixed value, and
wherein the second communication mode is a communication mode in which the communication parameter used by the external device to communicate with the communication unit can be set by a user.

4. The device according to claim 2, wherein in a case where the communication unit is operating in the second communication mode, the control unit controls the communication unit to operate in the first communication mode in response to receipt of the first operation.

5. The device according to claim 4, wherein after the control unit switches the communication unit from the second communication mode to the first communication mode in response to the receipt of the first operation, the control unit is configured to switch the communication unit from the first communication mode to the second communication mode in response to receipt of second operation.

6. The device according to claim 1, further comprising a setting unit configured to set an operation mode of the device among a plurality of operation modes including an image display mode in which an image is displayed on the display unit and a stand-by mode in which the image is not displayed on the display unit,
wherein the control unit causes the communication unit to operate in the first communication mode in response to receipt of the first operation in a case where an operation mode of the device is the stand-by mode, and causes the communication unit not to operate in the first communication mode even if the reception unit receives the first operation in a case where the operation mode of the device is the image display mode.

7. The device according to claim 1,
wherein the reception unit receives a signal from a remote control device, the signal corresponding to a user operation performed on the remote control device, and
wherein the control unit causes the communication unit to operate in the first communication mode in response to receipt of a signal from the remote control device, the signal corresponding to a third operation.

8. A method of controlling a device including a display unit configured to display an image, and a communication unit configured to communicate with an external device, the method comprising:
receiving a user operation performed on an operation member; and
controlling the communication unit,
wherein the controlling causes the communication unit to operate in a first communication mode in response to receipt of a first operation received in the receiving while the display unit does not display an image, and causes the communication unit not to operate in the first communication mode even if the first operation is received in the receiving while the display unit displays an image.

9. The method according to claim 8, wherein the controlling causes the communication unit to operate in a second communication mode in response to receipt, in the receiving, of an operation on a setting screen displayed by the display unit.

10. The method according to claim 9,
wherein the first communication mode is a communication mode in which a communication parameter used by the external device to communicate with the communication unit is set to a fixed value, and
wherein the second communication mode is a communication mode in which a communication parameter used by the external device to communicate with the communication unit can be set by a user.

11. The method according to claim 9, wherein in a case where the communication unit is operating in the second communication mode, the controlling controls the communication unit to operate in the first communication mode in response to receipt of the first operation.

12. The method according to claim 11, wherein after the controlling switches the communication unit from the second communication mode to the first communication mode in response to the receipt of the first operation, the controlling switches the communication unit from the first communication mode to the second communication mode in response to receipt of a second operation received in the receiving.

13. The method according to claim 8, further comprising setting an operation mode of the device among a plurality of operation modes including an image display mode in which an image is displayed on the display unit and a stand-by mode in which an image is not displayed on the display unit,
wherein the controlling causes the communication unit to operate in the first communication mode in response to receipt of the first operation in a case where an operation mode of the electronic device is the stand-by mode, and causes the communication unit not to operate in the first communication mode even if the first operation is received in the receiving in a case where the operation mode of the electronic device is the image display mode.

14. The method according to claim 8,
wherein the receiving receives a signal from a remote control device, the signal corresponding to a user operation performed on the remote control device, and
wherein the controlling causes the communication unit to operate in the first communication mode in response to receipt of a signal from the remote control device, the signal corresponding to a third operation.

15. A non-transitory computer-readable storage medium storing a program for causing a computer to perform a method of controlling a device, the method comprising:
receiving a user operation performed on an operation member; and
controlling a communication unit,
wherein the controlling causes the communication unit to operate in a first communication mode in response to receipt of a first operation received in the receiving while a display unit does not display an image, and causes the communication unit not to operate in the first communication mode even if the first operation is received in the receiving while the display unit displays an image.

16. The non-transitory computer-readable storage medium according to claim 15, wherein the controlling causes the communication unit to operate in a second communication mode in response to receipt, in the receiving, of an operation on a setting screen displayed by the display unit.

17. The non-transitory computer-readable storage medium according to claim 16,
wherein the first communication mode is a communication mode in which a communication parameter used by the external device to communicate with the communication unit is set to a fixed value, and
wherein the second communication mode is a communication mode in which a communication parameter used by the external device to communicate with the communication unit can be set by a user.

18. The non-transitory computer-readable storage medium according to claim 16, wherein in a case where the communication unit is operating in the second communication mode, the controlling controls the communication unit to operate in the first communication mode in response to receipt of the first operation.

19. The non-transitory computer-readable storage medium according to claim 15, further comprising setting an operation mode of the device among a plurality of operation modes including an image display mode in which an image is displayed on the display unit and a stand-by mode in which an image is not displayed on the display unit,
wherein the controlling causes the communication unit to operate in the first communication mode in response to receipt of the first operation in a case where an operation mode of the electronic device is the stand-by mode, and causes the communication unit not to operate in the first communication mode even if the first operation is received in the receiving in a case where the operation mode of the electronic device is the image display mode.

20. The non-transitory computer-readable storage medium according to claim 15,
wherein the receiving receives a signal from a remote control device, the signal corresponding to a user operation performed on the remote control device, and wherein the controlling causes the communication unit to operate in the first communication mode in response to receipt of a signal from the remote control device, the signal corresponding to a third operation.

\* \* \* \* \*